United States Patent
Lee et al.

(10) Patent No.: US 7,603,252 B2
(45) Date of Patent: Oct. 13, 2009

(54) METHOD AND APPARATUS FOR CALCULATING EFFECTIVE VOLUME OF DIESEL PARTICULATE FILTER

(75) Inventors: Jae Yeon Lee, Seoul (KR); Youngjun Roh, Anyang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/323,389

(22) Filed: Nov. 25, 2008

(65) Prior Publication Data

US 2009/0157348 A1 Jun. 18, 2009

(30) Foreign Application Priority Data

Dec. 14, 2007 (KR) .................. 10-2007-0131669

(51) Int. Cl.
*G01B 7/00* (2006.01)
(52) U.S. Cl. .................. 702/155; 702/156; 60/297; 60/274; 60/277; 60/311; 701/102; 701/107; 701/114; 73/38; 73/40
(58) Field of Classification Search ......... 702/155–156; 60/274, 297, 311; 73/38, 40, 49.7; 701/102, 701/107, 114
See application file for complete search history.

(56) References Cited

U.S. PATENT DOCUMENTS 6,964,694 B2 * 11/2005 Rauchfuss et al. ............... 95/1
7,065,960 B2 * 6/2006 Gioannini et al. ............ 60/295
7,340,887 B2 * 3/2008 Ante et al. .................... 60/297

* cited by examiner

*Primary Examiner*—Tung S Lau
*Assistant Examiner*—Sujoy K Kundu
(74) *Attorney, Agent, or Firm*—Morgan, Lewis & Bockius LLP

(57) ABSTRACT

A method for calculating the effective volume of a diesel particulate filter invention may include: determining whether regeneration efficiency exists; determining, if regeneration efficiency exists, whether a learning condition of the ash coefficient is satisfied; detecting an exhaust flow amount $Q_{exh}$ if the learning condition of the ash coefficient is satisfied; calculating change of a pressure difference $\Delta(\Delta P_{ash(n)})$ caused by the ash; calculating change of an ash coefficient $\delta(a_4)$ by using the change of the pressure difference $\Delta(\Delta P_{ash(n)})$ caused by the ash and the exhaust flow amount $Q_{exh}$; calculating a current ash coefficient $a_{4(n)}$ by using the change of the ash coefficient $\delta(a_4)$ and a previous ash coefficient $a_{4(n-1)}$; and calculating the effective volume $V_e$ by using the current ash coefficient $a_{4(n)}$ and a first filter coefficient $a_1$.

9 Claims, 4 Drawing Sheets

METHOD AND APPARATUS FOR CALCULATING EFFECTIVE VOLUME OF DIESEL PARTICULATE FILTER

CROSS-REFERENCE TO RELATED APPLICATION

The present application claims priority to Korean Patent Application No. 10-2007-0131669 filed on Dec. 14, 2007, the entire contents of which application is incorporated herein for all purposes by this reference.

BACKGROUND OF THE INVENTION

1. Field of the Invention

The present invention relates to a method for calculating the effective volume of a diesel particulate filter. More particularly, the present invention relates to a method for calculating the effective volume of a diesel particulate filter that enables regeneration timing of soot to be precisely determined by precisely calculating the effective volume of the diesel particulate filter based on a learned value of an ash coefficient and reduces time and cost for modifying an ash amount.

2. Description of Related Art

Generally, as ash becomes piled up in a diesel particulate filter, the effective volume where soot can be piled up is decreased. Such an effective volume and a temperature of an exhaust gas are principal factors for determining regeneration timing of soot in a diesel particulate filter.

According to known methods, a change of effective volume caused by ash according to a travel distance of a vehicle and fuel consumption is stored in a map table. Therefore, various efforts have been exerted so as to improve accuracy in prediction of the soot pile by using the map table. However, since a great number of experiments should be carried out in order to make the map table, a great amount of time and cost are needed for making the map table.

Further, since the soot pile is influenced by various factors besides the travel distance of the vehicle and the fuel consumption, there are problems such that the map table is not accurate.

To solve such problems, a method for calculating the change of the effective volume caused by the ash has been invented. According to the method, various driving modes are divided into three representative driving modes, e.g. city mode, highway mode, and mixed road mode, and ash pile and pressure difference caused by the ash according to the fuel consumption and oil consumption is calculated at respective modes. After that, the change of effective volume caused by the ash is calculated. However, since fuel consumption and oil consumption are changed variously according to type and state of the vehicle, the change of the effective volume caused by the ash must be modified.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for calculating the effective volume of a diesel particulate filter having advantages of precisely calculating the effective volume of the diesel particulate filter by using a learned value of an ash coefficient.

In addition, the present invention has been made in an effort to provide a method for calculating the effective volume of a diesel particulate filter having further advantages of calculating the change of the effective volume caused by the ash by using measured values of sensors regardless of the type and state of a vehicle, fuel consumption, and oil consumption.

In various aspects of the present invention, a method for calculating an effective volume $V_e$ of a diesel particulate filter, may include determining whether regeneration efficiency exists after soot is regenerated, determining, if the regeneration efficiency exists, whether a learning condition of an ash coefficient $\delta(a_4)$ is satisfied, detecting an exhaust flow amount $Q_{exh}$ of an exhaust gas if the learning condition of the ash coefficient $\delta(a_4)$ is satisfied, calculating change of a pressure difference $\Delta(\Delta P_{ash(n)})$ of the exhaust gas caused by the ash, calculating change of the ash coefficient $\delta(a_4)$ by using the change of the pressure difference $\Delta(\Delta P_{ash(n)})$ of the exhaust gas caused by the ash and the exhaust flow amount $Q_{exh}$, calculating a current ash coefficient $a_{4(n)}$ by using the change of the ash coefficient $\delta(a_4)$ and a previous ash coefficient $a_{4(n-1)}$, and/or determining the effective volume $V_e$ of the diesel particulate filter by using the current ash coefficient $a_{4(n)}$ and a first filter coefficient $a_1$.

The method may further include determining regeneration timing of the soot from determination of the effective volume $V_e$ of the diesel particulate filter.

The regeneration efficiency may be determined to exist when amount of the soot after the regeneration is smaller than a threshold soot amount.

The learning condition of the ash coefficient may be determined to be satisfied in a case that the exhaust flow amount is within a predetermined range, a change rate of filter pressure difference per a unit time is smaller than a predetermined change rate, and a vehicle speed is larger than or equal to a predetermined speed.

The change of the ash coefficient $\delta(a_4)$ may be calculated from the equation $$\delta(a_4) = \frac{\Delta(\Delta P_{ash(n)})}{\mu \cdot Q_{exh}},$$

wherein $\Delta(\Delta P_{ash(n)})$ represents the change of the pressure difference caused by the ash, $\mu$ represents a viscosity coefficient of the exhaust gas, and $Q_{exh}$ represents the exhaust flow amount.

The current ash coefficient $a_{4(n)}$ may be calculated from the equation $a_{4(n)} = a_{4(n-1)} + \delta(a_4)$, wherein $a_{4(n-1)}$ represents the previous ash coefficient, and $\delta(a_4)$ represents the change of the ash coefficient.

The effective volume $V_e$ may be calculated from the equation $$V_e = \frac{a_1}{a_1 + a_{4(n)}} * L * A,$$

wherein $a_1$ represents the first filter coefficient, $a_{4(n)}$ represents the current ash coefficient, L represents length of a channel in a filter, and A represents an effective cross-section of the filter.

The change of the ash coefficient $\delta(a_4)$ may be determined by a least square method.

The exhaust flow amount $Q_{exh}$ may be detected by a flow meter, or an air mass flow sensor and fuel flow meter commonly installed in an engine, the pressure difference $\Delta(\Delta P_{ash(n)})$ may be detected by a pressure sensor, and/or the effective volume $V_e$ may be determined by a control unit.

In further various aspects of the present invention, a system for calculating an effective volume $V_e$ of a diesel particulate filter, may include means for determining whether regeneration efficiency exists after soot is regenerated, means for determining, if the regeneration efficiency exists, whether a learning condition of an ash coefficient $\delta(a_4)$ is satisfied, means for detecting an exhaust flow amount $Q_{exh}$ of an exhaust gas if the learning condition of the ash coefficient $\delta(a_4)$ is satisfied, means for calculating change of a pressure difference $\Delta(\Delta P_{ash(n)})$ of the exhaust gas caused by the ash, means for calculating change of the ash coefficient $\delta(a_4)$ by using the change of the pressure difference $\Delta(\Delta P_{ash(n)})$ of the exhaust gas caused by the ash and the exhaust flow amount $Q_{exh}$, means for calculating a current ash coefficient $a_{4(n)}$ by using the change of the ash coefficient $\delta(a_4)$ and a previous ash coefficient $a_{4(n-1)}$, and/or means for determining the effective volume $V_e$ of the diesel particulate filter by using the current ash coefficient $a_{4(n)}$ and a first filter coefficient $a_1$.

The system may further include means for determining regeneration timing of soot from the calculated effective volume $V_e$ of the diesel particulate filter.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
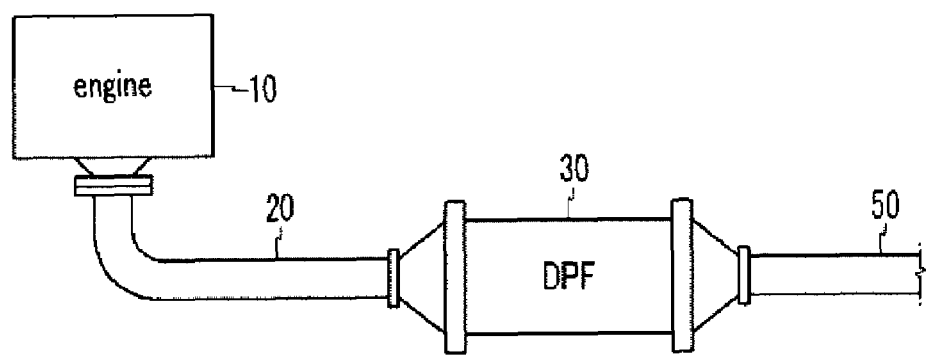
FIG. 1 is a schematic diagram showing an exemplary diesel particulate filter mounted on an exhaust pipe.

FIG. 1 is a schematic diagram showing a diesel particulate filter mounted on an exhaust pipe.

As shown in FIG. 1, a diesel particulate filter 30 is mounted between a front exhaust pipe 20 and a rear exhaust pipe 50. Therefore, exhaust gas flowed out from an engine 10 is flowed into the diesel particulate filter 30 through the front exhaust pipe 20, and the diesel particulate filter 30 filters the exhaust gas. After that, the filtered exhaust gas is flowed out to the air through the rear exhaust pipe 50.

Figure 2:
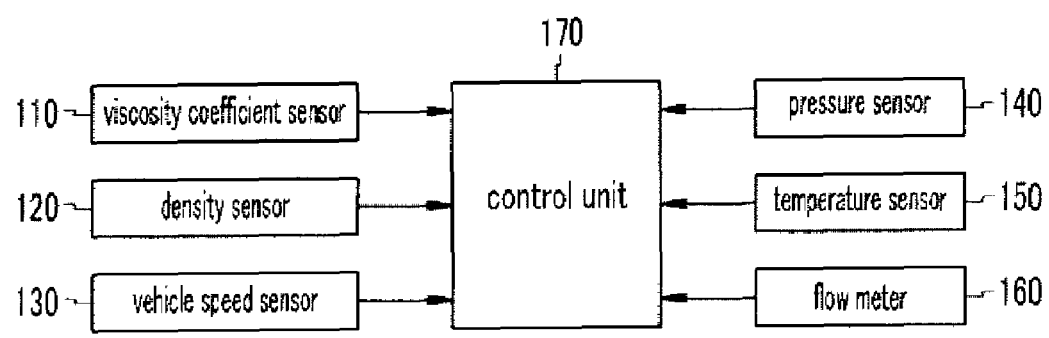
FIG. 2 is a schematic diagram of an exemplary system applicable to a method for calculating the effective volume of a diesel particulate filter according to the present invention.

FIG. 2 is a schematic diagram of a system applicable to a method for calculating effective volume of a diesel particulate filter according to various embodiments of the present invention.

As shown in FIG. 2, a system applicable to a method for calculating effective volume of a diesel particulate filter according to various embodiments of the present invention includes a viscosity coefficient sensor 110, a density sensor 120, a vehicle speed sensor 130, a pressure sensor 140, a temperature sensor 150, a flow meter 160, and a control unit 170.

The viscosity coefficient sensor 110 is mounted at the front exhaust pipe 20, detects the viscosity coefficient of the exhaust gas, and transmits a signal corresponding thereto to the control unit 170. Instead of using the viscosity coefficient sensor 110, the viscosity coefficient of the exhaust gas may be stored as a function of exhaust gas temperature in the control unit 170 and be calculated using measured value of the temperature sensor 150.

The density sensor 120 is mounted at the front exhaust pipe 20, detects the density of the exhaust gas, and transmits a signal corresponding thereto to the control unit 170. Instead of using the density sensor 120, the density of the exhaust gas may be calculated using measured values of the pressure sensor 140 and the temperature sensor 150 in the control unit 170.

The vehicle speed sensor 130 is mounted at a vehicle wheel, detects a vehicle speed, and transmits a signal corresponding thereto to the control unit 170.

The pressure sensors 140 are mounted respectively at the front exhaust pipe 20 and the rear exhaust pipe 50, detect the exhaust pressure of the front exhaust pipe 20 and the exhaust pressure of the rear exhaust pipe 50, and transmit a signal corresponding thereto to the control unit 170.

The temperature sensor 150 is mounted at an inlet portion of the diesel particulate filter 30, detects temperature of the exhaust gas, and transmits a signal corresponding thereto to the control unit 170.

The flow meter 160 is mounted at the front exhaust pipe 20 or the rear exhaust pipe 50, detects the flow amount of the exhaust gas, and transmits a signal corresponding thereto to the control unit 170. Instead of using the flow meter 160, the exhaust flow amount may be calculated using measured values of the air mass flow sensor and the fuel flow meter which are commonly installed in the engine 10.

The control unit 170 can be realized by one or more processors activated by a predetermined program, and the predetermined program can be programmed to perform each step of a method for calculating the effective volume of a diesel particulate filter according to various embodiments the present invention.

The control unit 170 receives signals corresponding to the viscosity coefficient and the density of the exhaust gas, the vehicle speed, the exhaust pressures of the front exhaust pipe 20 and the rear exhaust pipe 50, the temperature of the exhaust gas, and the flow amount of the exhaust gas respectively from the viscosity coefficient sensor 110, the density sensor 120, the vehicle speed sensor 130, the pressure sensors 140, the temperature sensor 150, and the flow meter 160. The control unit 170 calculates the change of the ash coefficient $\delta(a_4)$, the current ash coefficient $a_{4(n)}$, and the effective volume $V_e$ of the diesel particulate filter 30 based on the received signals.

In addition, the control unit 170 calculates a filter pressure difference, which is a difference between the exhaust pressure of the front exhaust pipe 20 and the exhaust pressure of the rear exhaust pipe 50.

Figure 3:
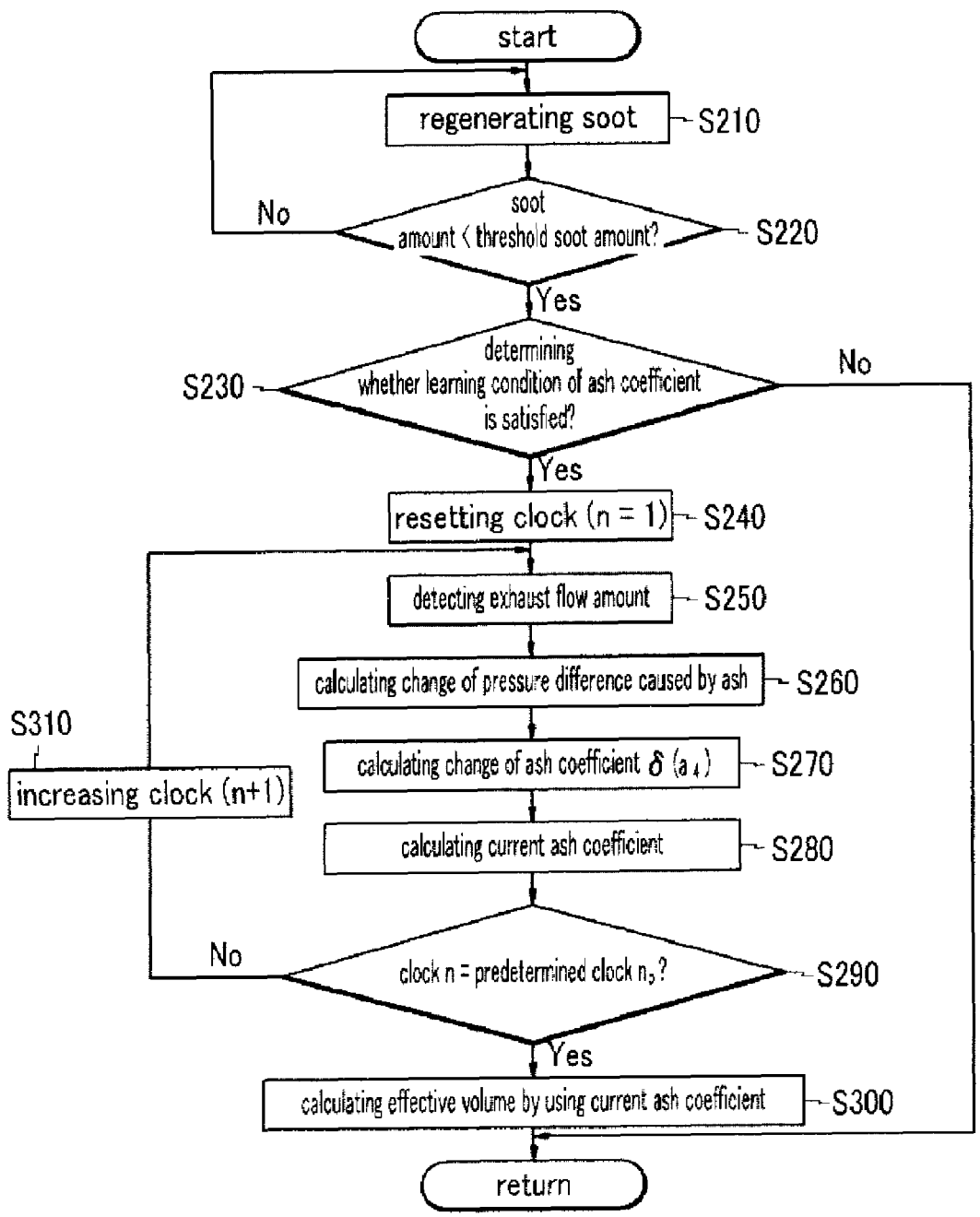
FIG. 3 is a flowchart of an exemplary method for calculating the effective volume of a diesel particulate filter according to the present invention.

FIG. 3 is a flowchart of a method for calculating the effective volume of a diesel particulate filter according to various embodiments of the present invention.

After soot is regenerated at a step S210, the control unit 170 determines whether regeneration efficiency exists at a step S220. The regeneration efficiency means regeneration of the soot is completed, and in a case that the soot amount is smaller than a threshold soot amount $S_{th}$, the control unit 170 determines that the regeneration efficiency exists and finishes the regeneration of the soot. One will appreciate that the threshold soot amount $S_{th}$ may be set as desired.

If the regeneration efficiency does not exist, the control unit 170 continues the regeneration of the soot.

If the regeneration efficiency exists, the control unit 170 determines whether a learning condition of an ash coefficient is satisfied at a step S230.

Generally, the filter pressure difference $\Delta P$ is calculated from the following Equation 1.

$$\Delta P = \Delta P_{clean\_filter} + \Delta P_{soot} + \Delta P_{ash} \qquad \text{Equation 1}$$

Here, $\Delta P_{clean\_filter}$ represents the pressure difference in a clean filter and is a constant value, $\Delta P_{soot}$ represents the pressure difference caused by the soot and is a variable value, and $\Delta_{ash}$ represents the pressure difference caused by the ash and is a variable value.

In addition, the pressure difference $\Delta P_{clean\_filter}$ in the clean filter, the pressure difference $\Delta P_{soot}$ caused by the soot, and the pressure difference $\Delta P_{ash}$ caused by the ash are calculated respectively from the following Equation 2, Equation 3, and Equation 4.

$$\Delta P_{clean\_filter} = a_1 \cdot \mu \cdot Q_{exh} + a_2 \cdot \rho \cdot Q_{exh}^2 \qquad \text{Equation 2}$$

$$\Delta P_{soot} = a_3 \cdot \mu \cdot Q_{exh} \qquad \text{Equation 3}$$

$$\Delta P_{ash} = a_4 \cdot \mu \cdot Q_{exh} \qquad \text{Equation 4}$$

Here, $\mu$ represents the viscosity coefficient of the exhaust gas, $Q_{exh}$ represents the flow amount of the exhaust gas, and $\rho$ represents the density of the exhaust gas.

In addition, $a_1$ represents a first filter coefficient, $a_2$ represents a second filter coefficient, $a_3$ represents a soot coefficient, and $a_4$ represents an ash coefficient.

The $a_1$ and $a_2$ are set according to experiments done by using a brand-new diesel particulate filter without the soot and the ash, and $a_3$ is also set according to soot pile experiments by using a brand-new diesel particulate filter.

However, $a_4$ is a variable value according to the ash amount, and thus the learning condition of the ash coefficient must be satisfied so as to measure $a_4$.

The learning condition of the ash coefficient is satisfied in a case that the exhaust flow amount is within a predetermined range, the change rate of the filter pressure difference per unit time is smaller than a predetermined change rate, and the vehicle speed is larger than or equal to a predetermined speed.

That is, in a state that the change of the pressure difference caused by the soot pile is very small, the learning of the ash coefficient begins. The predetermined range, the predetermined change rate, and the predetermined speed can be arbitrarily set by a person of an ordinary skill in the art.

If the learning condition of the ash coefficient is satisfied, the control unit 170 resets a clock (i.e., n is substituted by 1) at a step S240, the flow meter 160 detects the exhaust flow amount $Q_{exh}$ at a step S250, and the control unit 170 calculates the change of the pressure difference $\Delta(\Delta P_{ash(n)})$ caused by the ash at a step S260.

The change of the pressure difference $\Delta(\Delta P_{ash(n)})$ caused by the ash is calculated by subtracting a previous pressure difference $\Delta P_{ash(n-1)}$ caused by the ash from the current pressure difference $\Delta P_{ash(n)}$ caused by the ash. In this case, since the change of the pressure difference caused by the soot is very small, the pressure difference $\Delta(\Delta P_{ash(n)})$ caused by the ash is calculated by subtracting the pressure difference $\Delta P_{clean\_filter}$ in the clean filter calculated from Equation 2 from the filter pressure difference $\Delta P$ detected by the pressure sensors 140. Meanwhile, an initial pressure difference $\Delta P_{ash(0)}$ caused by the ash is set as 0.

After that, the control unit 170 calculates change of the ash coefficient $\delta(a_4)$ from the following Equation 5 at a step S270.

$$\delta(a_4) = \frac{\Delta(\Delta P_{ash(n)})}{\mu \cdot Q_{exh}} \qquad \text{Equation 5}$$

Figure 4:
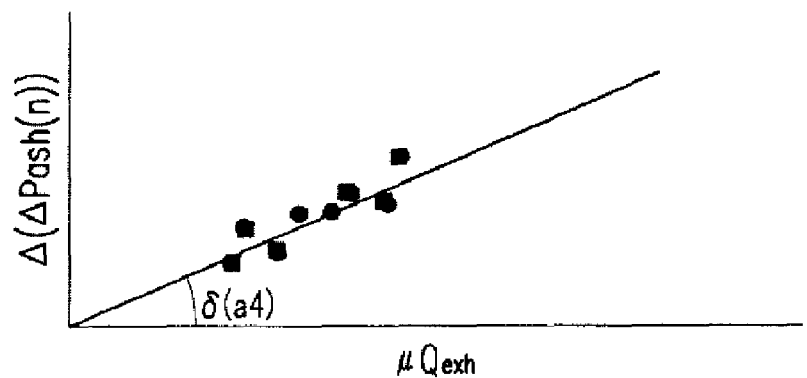
FIG. 4 is a graph showing change of the ash coefficient used in an exemplary method for calculating the effective volume of a diesel particulate filter according to the present invention.

As shown in FIG. 4, the change of the ash coefficient $\delta(a_4)$ is calculated according to a least square method.

After that, the control unit 170 calculates a current ash coefficient $a_{4(n)}$ from the following Equation 6 at a step S280.

$$a_{4(n)} = (a_{4(n-1)} + \delta(a_4)) \qquad \text{Equation 6}$$

Here, $a_{4(n-1)}$ is a previous ash coefficient, and $a_{4(0)}$ is set as 0.

After that, the control unit 170 repeats the step S250 to the step S280 by predetermined clocks $n_p$.

That is, the control unit 170 determines whether a clock n is the same as the predetermined clock $n_p$ at a step S290.

If the clock n is different from the predetermined clock $n_p$, the clock is increased by 1 (i.e., n=n+1) at a step S310, and the control unit 170 repeats the step S250 to the step S280.

If the clock n is the same as the predetermined clock $n_p$, the control unit 170 stores the current ash coefficient $a_{4(n)}$ and calculates the effective volume at a step S300.

The effective volume is calculated as follows.

Figure 5:
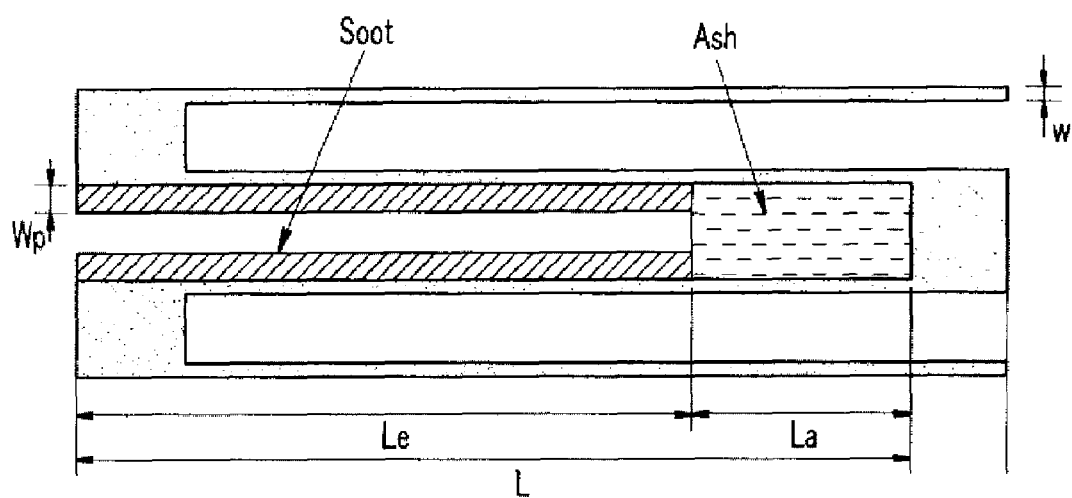
FIG. 5 is a schematic diagram showing an inside of an exemplary diesel particulate filter applicable to an exemplary method for calculating the effective volume of a diesel particulate filter according to the present invention.

If uniform flow is assumed in a state that the regeneration of the soot is completed, an inside of the diesel particulate filter 30 is abbreviated as shown in FIG. 5.

According to Darcy's law, the filter pressure difference $\Delta P$ is represented as in the following Equation 7.

$$\begin{aligned}\Delta P &= \frac{\mu v w}{k} \\ &= \frac{\mu (Q_{exh}/A) w}{k} \\ &= \frac{\mu Q_{exh} w}{4 k D_h x} \\ &= (a_1 + a_{4(n)}) Q_{exh}\end{aligned} \qquad \text{Equation 7}$$

Here, k represents a wall transmissivity, w represents a wall thickness, $D_h$ represents flow diameter, x represents an effective length of a channel, and A represents an effective cross-section of the filter and is represented by the equation $A = 4D_h x$.

In a case that the ash does not exist, that is, in a case that the effective length x of the channel is the same as a length L of the channel and the current ash coefficient $a_{4(n)}$ is 0, the filter pressure difference $\Delta P$ is represented by the following Equation 8.

$$\Delta P = \frac{\mu Q_{exh} w}{4k D_h L} = a_1 \mu Q_{exh} \qquad \text{Equation 8}$$

In a case that the ash is piled up and the effective length X of the channel is the same as Le, the filter pressure difference $\Delta P$ is represented by the following Equation 9.

$$\Delta P = \frac{\mu Q_{exh} w}{4k D_h Le} = (a_1 + a_{4(n)}) \mu Q_{exh} \qquad \text{Equation 9}$$

Equation 10 below can be attained from Equation 8 and Equation 9.

$$\frac{Le}{L} = \frac{a_1}{a_1 + a_{4(n)}} \qquad \text{Equation 10}$$

Therefore, the effective volume $V_e$ is calculated from the following Equation 11.

$$V_e = \frac{a_1}{a_1 + a_{4(n)}} * L * A \qquad \text{Equation 11}$$

Figure 6:
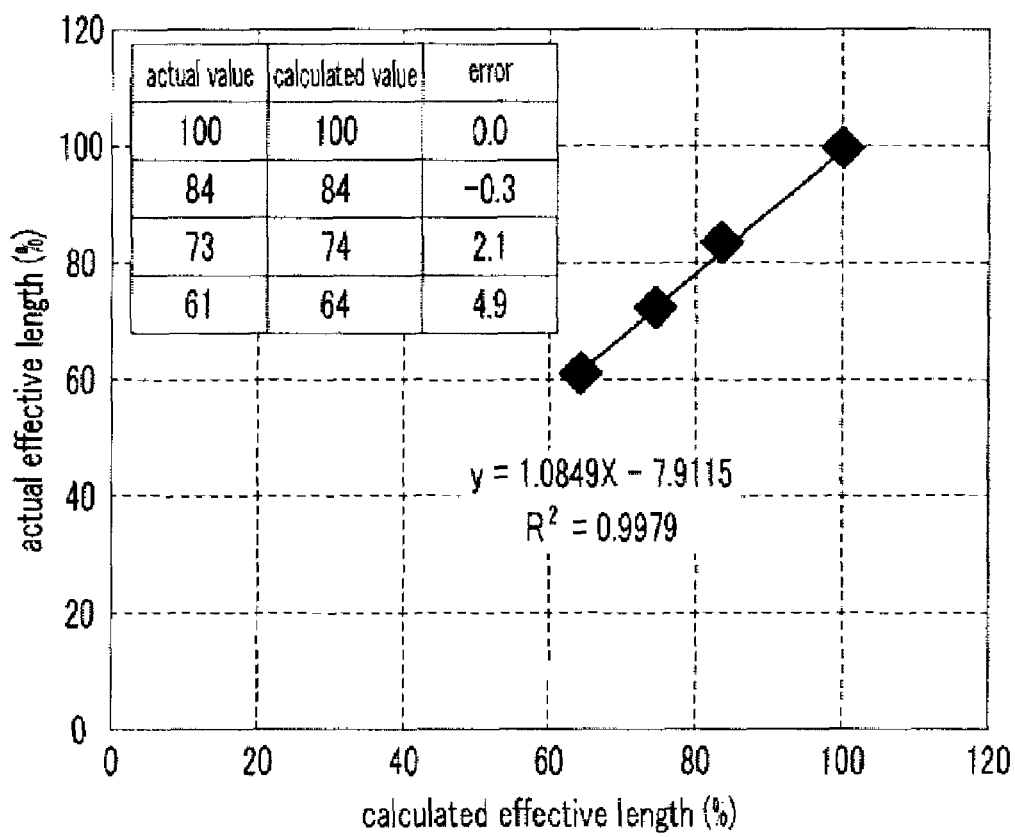
FIG. 6 is a graph showing actual effective length to calculated effective length calculated by an exemplary method for calculating the effective volume of a diesel particulate filter according to the present invention.

FIG. 6 is a graph showing actual effective length to calculated effective length calculated by a method for calculating the effective volume of a diesel particulate filter according to various embodiments of the present invention.

As shown in FIG. 6, the effective length calculated by the method for calculating the effective volume of a diesel particulate filter according to various embodiments of the present invention is within 5% range of the actual effective length. Therefore, according to various embodiments of the present invention, the effective volume of the diesel particulate filter may be precisely calculated.

As described above, the effective volume of a diesel particulate filter may be precisely calculated by a learned value of an ash coefficient.

In addition, since change of the effective volume caused by ash can be calculated by using measured values of sensors regardless of the type and state of a vehicle, fuel consumption, and oil consumption, time and effort for modifying an ash amount may be reduced.

For convenience in explanation and accurate definition in the appended claims, the terms "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for calculating an effective volume $V_e$ of a diesel particulate filter, comprising:
   means for determining whether regeneration efficiency exists after soot is regenerated;
   means for determining, if the regeneration efficiency exists, whether a learning condition of an ash coefficient $\delta(a_4)$ is satisfied;
   means for detecting an exhaust flow amount $Q_{exh}$ of an exhaust gas if the learning condition of the ash coefficient $\delta(a_4)$ is satisfied;
   means for calculating change of a pressure difference $\Delta(\Delta P_{ash(n)})$ of the exhaust gas caused by the ash;
   means for calculating change of the ash coefficient $\delta(a_4)$ by using the change of the pressure difference $\Delta(\Delta P_{ash(n)})$ of the exhaust gas caused by the ash and the exhaust flow amount $Q_{ash}$;
   means for calculating a current ash coefficient $a_{4(n)}$ by using the change of the ash coefficient $\delta(a_4)$ and a previous ash coefficient $a_{4(n-1)}$; and
   means for determining the effective volume $V_e$ of the diesel particulate filter by using the current ash coefficient $a_{4(n)}$ and a first filter coefficient $a_1$.

2. The system of claim 1, further comprising means for determining regeneration timing of soot from the calculated effective volume $V_e$ of the diesel particulate filter.

3. The system of claim 1, wherein the regeneration efficiency is determined to exist when amount of the soot after the regeneration is smaller than a threshold soot amount.

4. The system of claim 1, wherein the learning condition of the ash coefficient is determined to be satisfied in a case that the exhaust flow amount is within a predetermined range, a change rate of filter pressure difference per a unit time is smaller than a predetermined change rate, and a vehicle speed is larger than or equal to a predetermined speed.

5. The system of claim 1, wherein the change of the ash coefficient $\delta(a_4)$ is calculated from the equation $$\delta(a_4) = \frac{\Delta(\Delta P_{ash(n)})}{\mu \cdot Q_{exh}},$$

wherein $\Delta(\Delta P_{ash(n)})$ represents the change of the pressure difference caused by the ash, $\mu$ represents a viscosity coefficient of the exhaust gas, and $Q_{exh}$ represents the exhaust flow amount.

6. The system of claim 1, wherein the current ash coefficient $a_{4(n)}$ is calculated from the equation $a_{4(n)} = (a_{4(n-1)} + \delta(a_4))$, wherein $a_{4(n-1)}$ represents the previous ash coefficient, and $\delta(a_4)$ represents the change of the ash coefficient.

7. The system of claim 1, wherein the effective volume $V_e$ is calculated from the equation $$V_e = \frac{a_1}{a_1 + a_{4(n)}} * L * A,$$

wherein $a_1$ represents the first filter coefficient, $a_{4(n)}$ represents the current ash coefficient, L represents length of a channel in a filter, and A represents an effective cross-section of the filter.

8. The system of claim 1, wherein the change of the ash coefficient $\delta(a_4)$ is determined by a least square system.

9. The system of claim 1 for calculating the effective volume $V_e$ of a diesel particulate filter, wherein the exhaust flow amount $Q_{exh}$ is detected by a flow meter, or an air mass flow sensor and fuel flow meter commonly installed in an engine;

the pressure difference $\Delta(\Delta P_{ash(n)})$ is detected by a pressure sensor; and the effective volume $V_e$ is determined by a control unit.

* * * * *